US009379640B2

(12) United States Patent
Mazumder

(10) Patent No.: US 9,379,640 B2
(45) Date of Patent: Jun. 28, 2016

(54) SCALABLE SINGLE-STAGE DIFFERENTIAL POWER CONVERTER

(75) Inventor: Sudip K. Mazumder, Chicago, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 151 days.

(21) Appl. No.: 14/128,844

(22) PCT Filed: Jun. 22, 2012

(86) PCT No.: PCT/US2012/043812

§ 371 (c)(1),
(2), (4) Date: Mar. 21, 2014

(87) PCT Pub. No.: WO2012/178056

PCT Pub. Date: Dec. 27, 2012

(65) Prior Publication Data

US 2014/0211521 A1    Jul. 31, 2014

Related U.S. Application Data

(60) Provisional application No. 61/500,344, filed on Jun. 23, 2011.

(51) Int. Cl.
*H02J 1/10* (2006.01)
*H02M 7/537* (2006.01)
*H02M 7/48* (2007.01)
*H02M 3/00* (2006.01)
*H02M 1/12* (2006.01)

(52) U.S. Cl.
CPC .............. *H02M 7/537* (2013.01); *H02M 3/005* (2013.01); *H02M 7/48* (2013.01); *H02M 7/4807* (2013.01); *H02M 1/12* (2013.01)

(58) Field of Classification Search
USPC .......................................................... 363/65
See application file for complete search history.

(56) References Cited

U.S. PATENT DOCUMENTS

| 5,442,539 A | 8/1995 | Cuk et al. |
| 6,084,792 A * | 7/2000 | Chen et al. ..................... 363/127 |
| 7,915,874 B1 * | 3/2011 | Cuk ............................... 323/224 |

(Continued)

FOREIGN PATENT DOCUMENTS

WO    WO 02/061928    8/2002

OTHER PUBLICATIONS

"Bi-Directional DC-AC Converters With High Frequency Isolation" by R.L. Cardoso et al, Jun. 2005, IEEE.*
Cuk, Sloban, et al., "A Conceptually New High-Frequency Switched-Mode Power Amplifier Technique Eliminates Current Ripple", *Proc. 5th Nat. Solid-State Power Conversion Conference*, 1978.

(Continued)

*Primary Examiner* — Jessica Han
*Assistant Examiner* — Lorena Bruner
(74) *Attorney, Agent, or Firm* — Greer, Burns & Crain, Ltd.

(57) ABSTRACT

An embodiment of the invention is a scalable single stage differential power converter. The inverter can be implemented in signal, split and multi-phases. A multiphase converter can be achieved with only three modules. Integrated magnetics used in preferred embodiments of the invention mitigate the DC component of the steady-state dynamics and can be extended to AC ripple mitigation. Control architectures in preferred embodiments can mitigate higher order harmonics in steady state dynamics. Embodiments of the invention also provide scalability for voltage and current source topologies.

16 Claims, 21 Drawing Sheets

(56) References Cited

U.S. PATENT DOCUMENTS

2010/0148743 A1* 6/2010 Martin ................ H02M 3/1584
  323/290
2010/0301833 A1* 12/2010 Foster ........................... 323/361

OTHER PUBLICATIONS

Mazumder, Sudip, et al., "A low-cost single-stage isolated differential Cuk inverter for fuel-cell application", *PESC 2008, IEEE*, pp. 4426.4431, 2008.

* cited by examiner

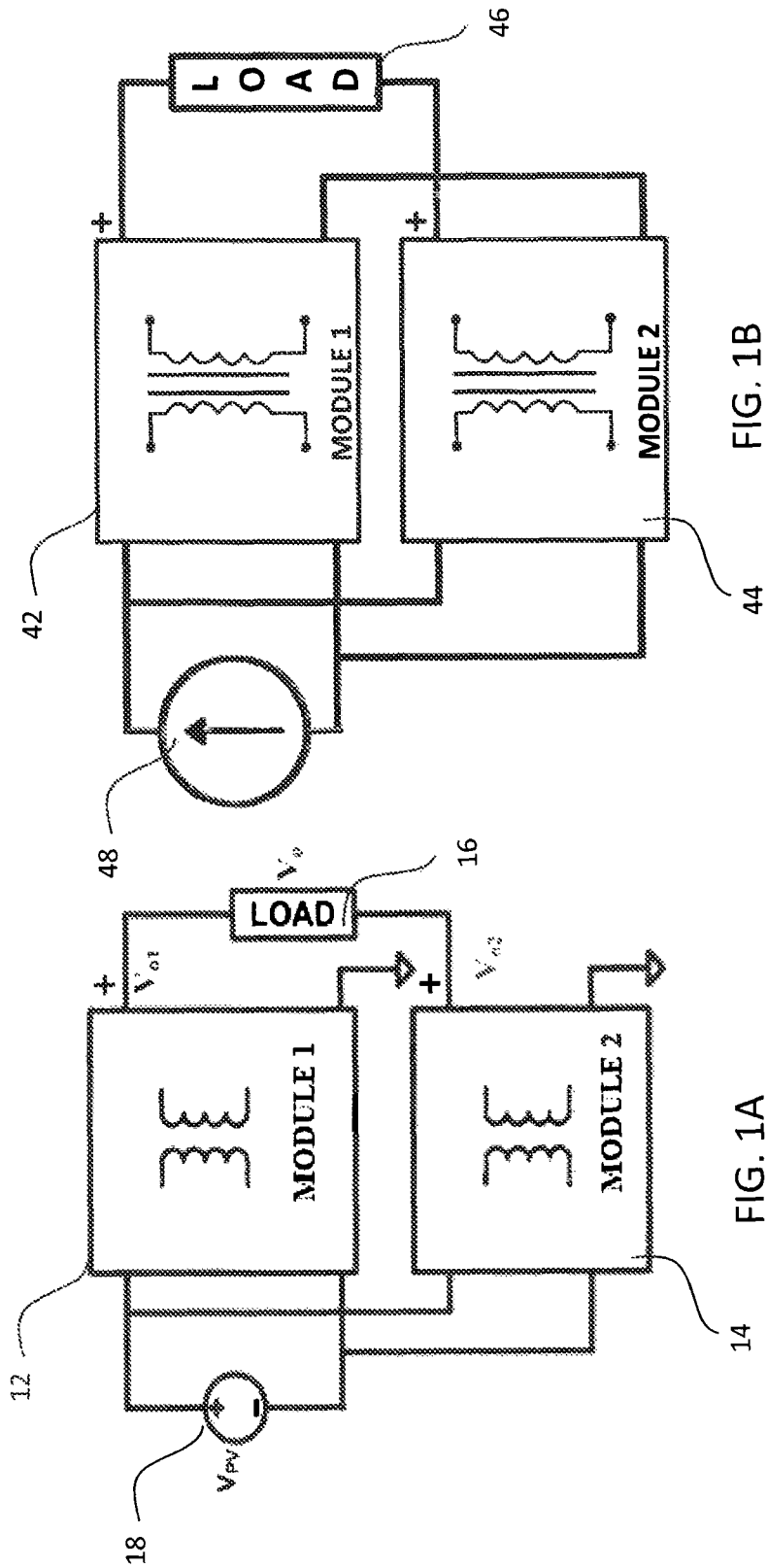

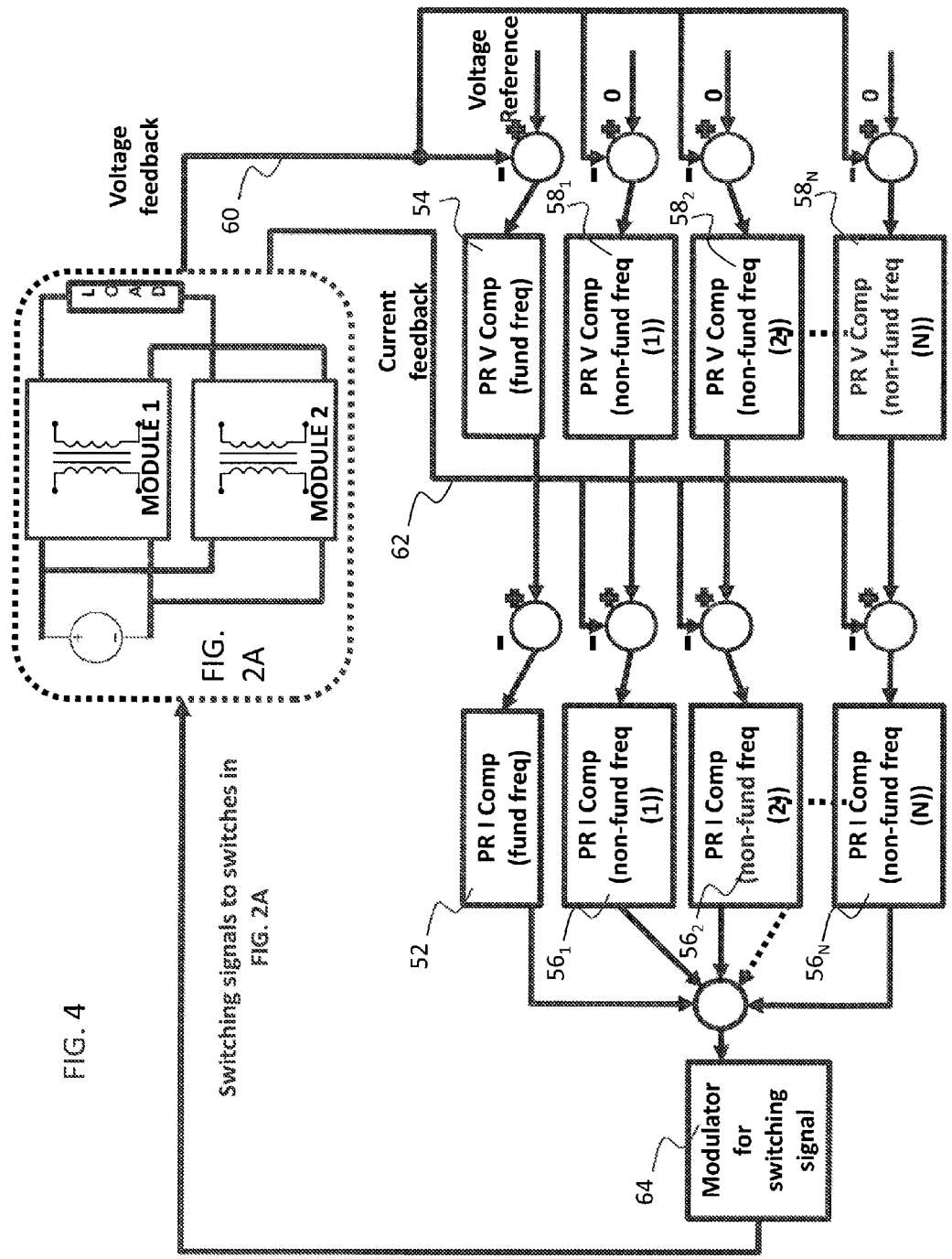

SCALABLE SINGLE-STAGE DIFFERENTIAL POWER CONVERTER

PRIORITY CLAIM AND REFERENCE TO RELATED APPLICATION

The application claims priority under 35 U.S.C. §119 from prior provisional application Ser. No. 61/500,344, which was filed Jun. 23, 2011.

STATEMENT OF GOVERNMENT INTEREST

This invention was made with Government support under Grant No. 0725887 awarded by the National Science Foundation. The Government has certain rights in the invention.

FIELD

A field of the invention is power conversion. Example applications of the invention include conversion of power from solar cells, fuel cells, batteries, wind energy source, grid to voltage levels required by a load or power system, including microgrid applications, electric vehicle applications.

BACKGROUND

Leveraging the potential of low power so-called green or renewable power sources such as photovoltaic (solar cells), fuel cells, wind and other such power generation technologies requires efficient and well-behaved converters. The power sources have a DC power output with relatively low power density and low level voltage. Many loads require higher voltage AC power. Inverting converter architectures are typically used to perform power conversion from such power generation technologies. Other loads can require higher voltage DC power, which also requires an up conversion from a renewable power source.

An initial DC/DC stage is most often used to initially boost voltage levels in a conversion for use with an AC load. A common architecture uses DC/DC up conversion stage follow by a DC/AC converter that is isolated from a load by an often bulky transformer. The bulky 60-Hz line transformer is not acceptable for compact applications. Another common architecture combines a DC/DC converter with a high-frequency transformer followed by a DC/AC converter, which is connected to a load/grid. A third common architecture is a variation of the last mentioned, but includes the high-frequency transformer in the DC/AC conversion stage. These latter two arrangements are known as high-frequency link (HFL) converters. In addition to the high-frequency transformer location, the location of an intermediate fixed, variable, or pulsating dc-link bus (often using an electrolytic capacitor) differs in these architectures.

These HFL converters are suitable for compact power electronics packaging and are, therefore, suitable for power-dense inverter applications. However, the HFL converters have limitations. Generally, the number of devices and the complexity of the drivers and protection circuitry are high in such HFL multi-stage converters. Further, and as mentioned earlier, some of the high-frequency converters may include intermediate stage high-voltage DC-link electrolytic capacitors that are bulky and have long-term reliability issues. Control is difficult in these arrangements because each of these multi-stage converters have to be controlled, which raises control complexity and computational burden. The arrangements are not always readily scalable because topology is often functionality dependent and a generic architecture may come at the price of higher number of devices and associated drive and protection complexities. These architectures also have more difficult path to achieving desirable efficiency since loss of each stage of the multistage converter has to be controlled via careful and complex design.

A single-stage converter, which alleviates some of the above-mentioned complexities and challenges in multi-stage HFL converters, would provide system-level value added from the simultaneous standpoints of cost, power density, reliability, and efficiency.

One isolated HFL single-stage differential inverter (i.e. DC-AC converter) was disclosed in S. K. Mazumder, R. K. Burra, R. Huang, and V. Arguelles, "A Low-Cost Single-Stage Isolated Differential Ćuk Inverter for Fuel Cell Application", IEEE Power Electronics Specialists Conference, pp. 4426-4431 (2008) for fuel cell applications based on the Ćuk topology. Ćuk converter for DC-DC applications was developed originally by Slobodan Ćuk and has been extensively researched. See, e.g., S. Ćuk and Z. Zhang, "A High Efficiency 500 W Step-up Ćuk Converter," Proc. of Power Electronics and Motion Control Conference (2000); D. Maskimovic and S Ćuk, "Switching Converters with Wide DC Conversion Range", IEEE Transactions on Power Electronics, 1991.

However, as mentioned above, the 2008 disclosure by S. K. Mazumder et al. was for an inverter (DC-AC) and not for a DC-DC application and had a differential mode. While this concept provided a low-circuit-count design, problems with this design related to scalability, noise components, and nonlinear voltage gain, and closed-loop control remained unresolved. Further, the signal-phase architecture in this paper would require six modules for providing three-phase power output. This increases device count and circuit complexity, while reducing efficiency and reliability. Inductors and transformers in the circuit in this paper were on a common core, but the circuit retains DC components of the dynamics. The control was via a simple PI (proportional integral controller) that had only a voltage loop. The nonlinearity of the voltage gain of the converter could not be adequately handled with this control, and that control was only demonstrated for the particular circuit and inverter type.

SUMMARY OF THE INVENTION

An embodiment of the invention is a scalable single-stage differential power converter. The converter can be implemented in signal, split and multi-phases (i.e. with two or more phases). In an example embodiment, a three-phase converter can be achieved with only three modules. The concept is also scalable for N-phase (with N>1) converter, which employs N modules. Integrated magnetics used in preferred embodiments of the invention mitigate the DC component of the steady-state dynamics and can be extended to AC ripple mitigation. Control architectures in preferred embodiments can mitigate higher order harmonics in steady-state dynamics. Embodiments of the invention also provide scalability for voltage- and current-source topologies.

BRIEF DESCRIPTION OF THE DRAWINGS

FIGS. 1A-1B illustrate the topology of preferred embodiment single-stage scalable converters including voltage-source single-stage and single-phase converter and current-source single-stage and single-phase converter;

FIG. 4 illustrates an inventive example controller architecture for converters that sets different fundamental and harmonic voltage loop references for an outer control loop and how the inner current loop follows the current references generated by the outer voltage loop;

DETAILED DESCRIPTION OF THE PREFERRED EMBODIMENTS

Figure 1D:
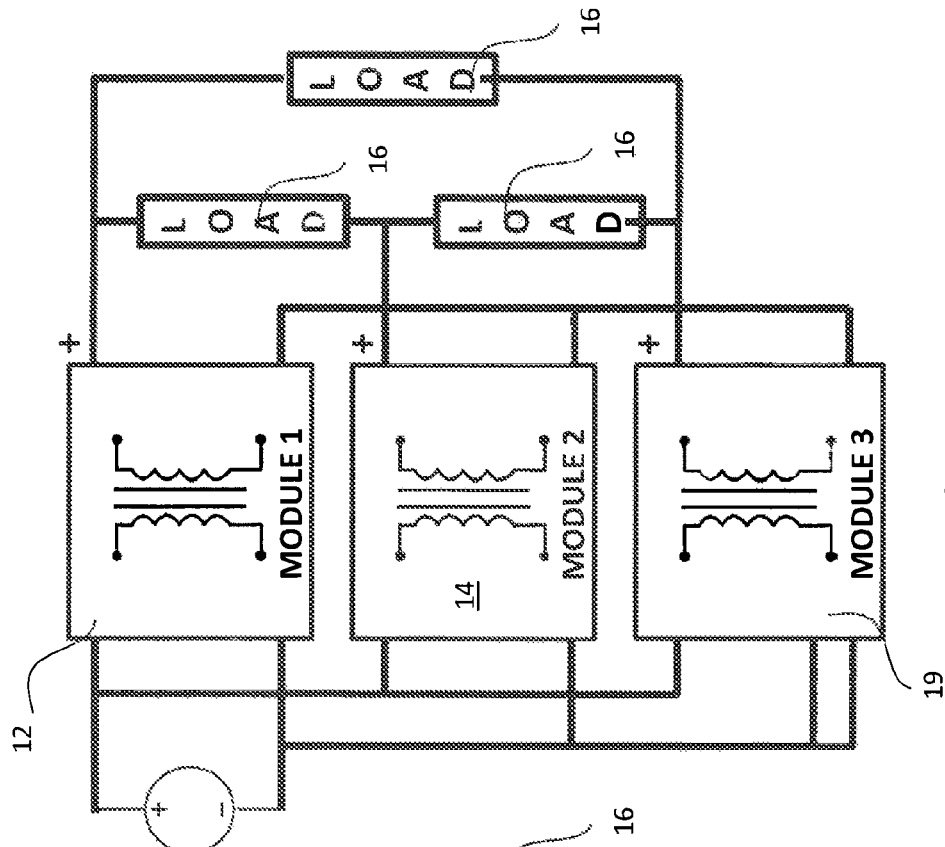
FIGS. 1C-1D illustrate how the concept in FIG. 1A is extendable to (for example) voltage-source single-stage split-phase converter and voltage source single-stage three phase converter, respectively.

An embodiment of the invention provides scalable differential power converters. Embodiments of the invention provide applicability for single phase and scalability for both split phase and multiple phases. An N-phase (with N>1) multiphase extension can be achieved with N modules. For instance, an example three-phase application will employ three modules. This reduces complexity by half compared to the Mazumder 2008 paper discussed in the background section. Integrated magnetics can be at module or converter level. Integrated magnetics at the converter level used in embodiments of the invention mitigate the DC component of the steady-state dynamics and can be extended for AC ripple mitigation via incorporation of ripple rejection circuitry. Preferred control architectures of the invention are applicable for single, split-, or multiple phases, can be scalable for linear/nonlinear compensation and stationary/time-invariant frame, and can overcome the nonlinearity of the converter voltage gain using a limited number of transformer turns ratio. The latter has a positive impact of reducing transformer leakage inductance, which can be especially for high-frequency operation. Control architectures in preferred embodiments can mitigate higher-order harmonics in steady-state dynamics. Embodiments of the invention also provide scalability for voltage and current source topologies.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

Embodiments of the invention include single-phase and multi-phase embodiments as well as voltage-source and current-source topologies. FIG. 1A illustrates a basic single-phase architecture with a voltage-source topology according to an example embodiment. FIG. 1B illustrates a current-source topology. The voltage-source topology 10 includes two converter modules 12, 14 between a load 16 and a voltage source 18. The current-source topology 40 includes two converter modules 42, 44 between a load 16 and a current source 48.

Both of the FIG. 1A and FIG. 1B topologies provide a single-stage power converter that can overcome key problems associated with larger footprint, higher complexity, and multiple stage designs. By also providing a modular and scalable design, cost reduction via interoperability and wide applicability is also achieved. Even though the designs in FIG. 1A and FIG. 1B have high-frequency transformers, the concept of the differential-mode configuration is applicable for non-isolated realization and scalable (just like its isolated counterpart) from single phase to split phase as well as multiple phases (with number of phases higher than 1). While a DC/AC conversion is assumed it is applicable also for both AC/DC, and AC/AC operation.

Figure 1C:
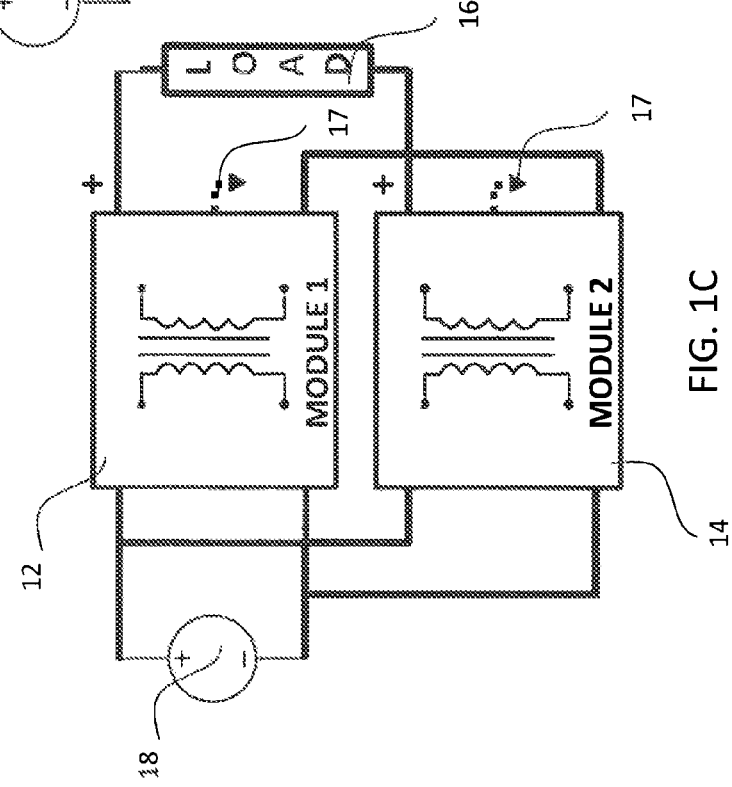

In FIG. 1A, the DC/AC inversion operation generates an output across each of the module 12, 14 that has a DC component and an AC component (which for sinusoidal output of the inverter is sinusoidal in nature). The overall output voltage for each module 12, 14 is positive. The AC sinusoidal signals are 180 degree out of phase, and the difference of the outputs of the two inverter modules eliminates the DC component while retaining the desired sinusoidal AC component. For split phase sinusoidal-output operation, the concept remains the same as above with the exception that a neutral 17 is brought out to ground as from each module 12, 14, as shown in FIG. 1C for the voltage-source topology. For three-phase sinusoidal output operation, the DC outputs of each of the blocks are not phase shifted by 180 degrees but by 120 degrees, as shown in FIG. 1D for the voltage-source topology, with a third module 19 being added. The concept illustrated in FIGS. 1C-1D is not limited to split and three phase architecture and is applicable to N-phase system in general, where N is greater than 2. Further, using the building block of FIG. 1B, current-sourced single-stage converters for split- and three-phase systems is extendable along the same lines as in FIGS. 1C-1D and the like the voltage-source topologies, the current source topology is also scalable for N-phase system. Extending this concept to a N-phase (with N greater than two) sinusoidal output system, the AC phase shift is 360/N degrees. When the desired output is not a sinusoid but contains other harmonics, then, the phase adjustments for single-, split-, and three- and higher-phase operations for each of the AC harmonic components is achieved along the same lines as that pursued for pre-sinusoidal operation.

Figure 2A:
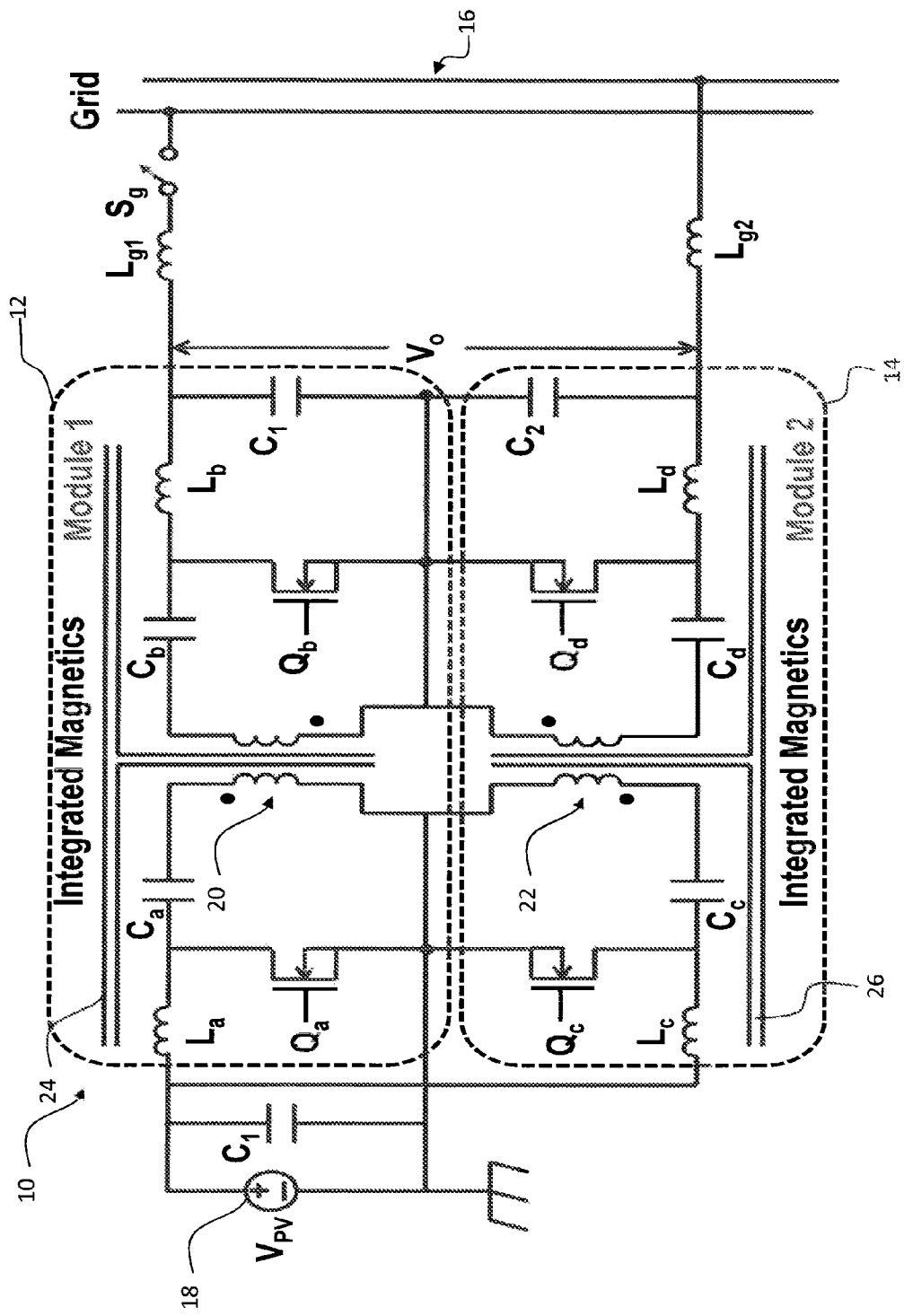
FIG. 2A shows a preferred embodiment voltage-source DC/AC power converter of the invention that uses Ćuk inverting converter modules.

FIG. 2A illustrates a preferred embodiment scalable differential inverter signal-stage single-phase power converter 10 that uses two isolated Ćuk converters as the modules 12 and 14 such as in FIGS. 1A and 1B, and an additional module can serve to create the three-phase converter in FIG. 1D. The inverting converter 10 of FIG. 2A uses the two isolated Ćuk converters 12 and 14 and the load 16 is connected differentially between the two converters 12 and 14. The load 16 is a grid in this case, such as a microgrid used for localized power delivery. The converter 10 converts power from a source 18, such as a photovoltaic cell. Each converter 12, 14 is controlled using sinusoidal pulse-width-modulated (PWM) signals with $Q_a=Q_a$, $Q_b=Q_c$ and $Q_a=/Q_b$. In a standard isolated Ćuk converter, the input/output voltage gain is obtained using (1):

$$\frac{V_o}{V_i} = \frac{D}{N(1-D)} \quad (1)$$

where D is the duty ratio and N is the turns ratio of the transformer. By taking the difference of the two converters and modulating the output sinusoidally, the voltage gain then becomes (2):

$$\frac{V_o}{V_i} = \frac{V_{max}}{V_i}\sin(\omega t) = \frac{2D-1}{ND(1-D)} \quad (2)$$

The solution for D can be expressed as in Eq (3):

$$D = \frac{(\alpha \cdot \sin(wt) - 2) \pm \sqrt{4 + (\alpha \cdot \sin(wt))^2}}{2\alpha \cdot \sin(wt)} = \frac{A \pm B}{C} \quad (3)$$

where $\alpha = V_m \cdot N/V_i$, which is a constant value and $V_m$, is the amplitude of the desired output sine wave.

Power is transferred via capacitors $C_a$ and $C_c$ from a primary input side of transformers 20 and 22 respectively to a secondary output side of the transformers 20 and 22 via capacitors $C_b$ and $C_d$. The two isolated Ćuk converters 12 and 14 can be operated differentially to create a well-behaved 60-Hz (cycles per second) sinusoidal output, or an output at a different predetermined desired frequency, such as the widely used 50-Hz frequency. The converter 10 provides direct DC/AC conversion with low device count and yields a simple drive-circuitry. This configuration can lower converter cost compared to HFL converters and can achieve high density and efficiency. The configuration of the converter 10 eliminates the need for a separate DC/DC converter stage, and has only four main devices, all of which are low-side driven. This yields a simple gate-drive circuitry as well as high efficiency and enhanced reliability. The magnetic devices can be coupled reduce the current ripple and decrease the size and weight.

Because the inverter converter 10 operates in a differential mode, the inductor currents flow from one Ćuk module into the other. FIGS. 2B-2E, respectively, illustrate the four modes of converter operation, which are achieved by applying Modes 1 and 2 (for the positive half of the line cycle) in FIGS. 2B and 2C, and by applying Modes 3 and 4 (for the negative half of the line cycle) in FIGS. 2D and 2E. Importantly, integrated magnetics 24 provide a path for current flow during a power conversion cycle.

Figure 2B:
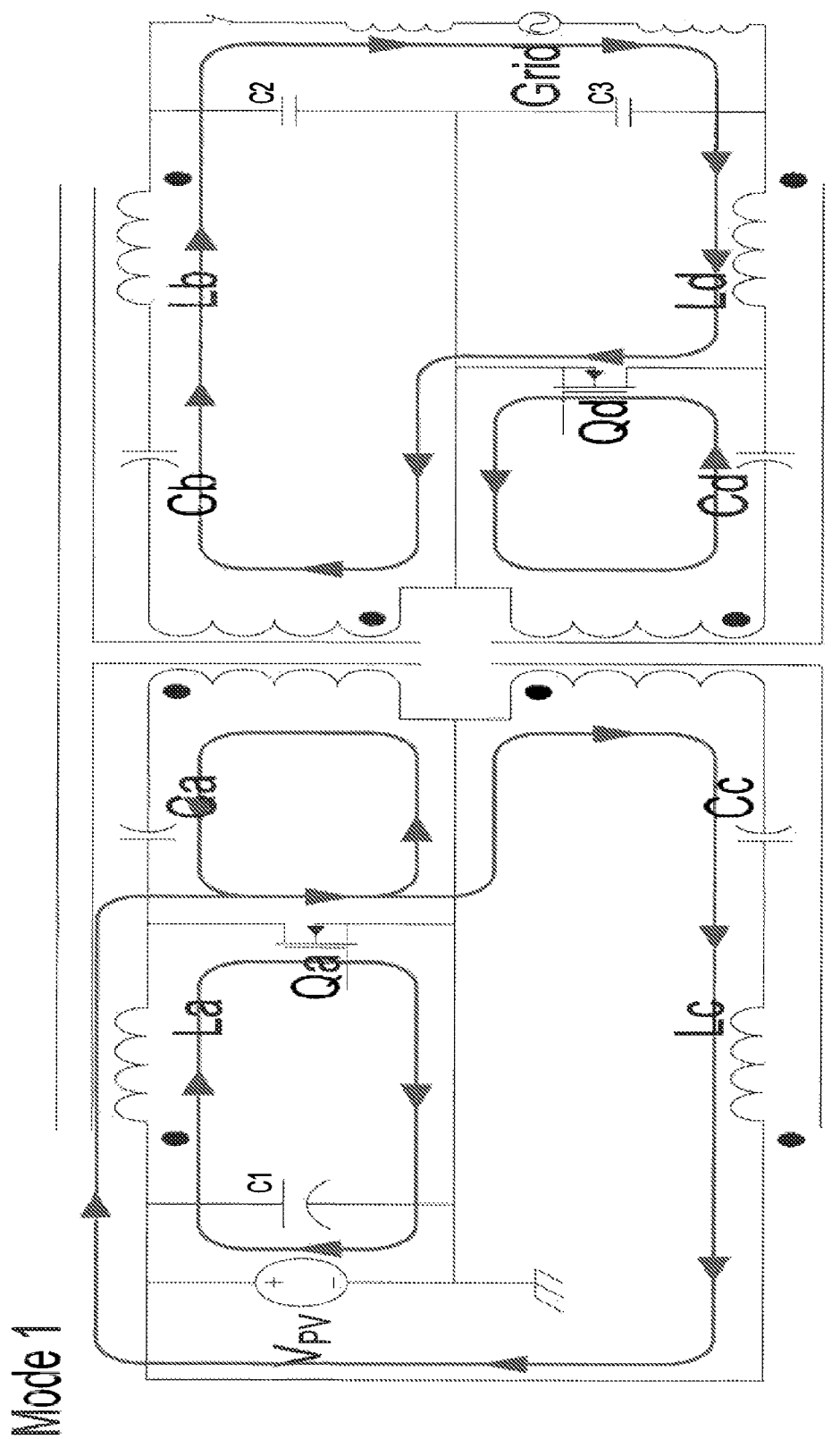
FIGS. 2B-2E illustrate current flow and switch states of the FIG. 2A embodiment during a complete power cycle.

In FIG. 2B (Mode 1), switches $Q_a$ and $Q_d$ are ON, and $Q_b$ and $Q_c$ are OFF. The current flowing through input inductor $L_a$ increases and the inductor stores energy. The capacitor $C_a$ discharges through $Q_a$ resulting in a transfer of energy from the primary to the secondary side of top transformer. The energy stored in the capacitor $C_b$ is discharged to the circuit formed by $L_b$, $C_2$, and the load R. Meanwhile, the inductor $L_d$ stores energy and its current increases. The capacitor $C_d$ discharges through $Q_d$. The power flows in the opposite direction in Module 2, from the secondary to the primary side. The capacitor $C_c$ is also discharged to provide the power.

Figure 2C:
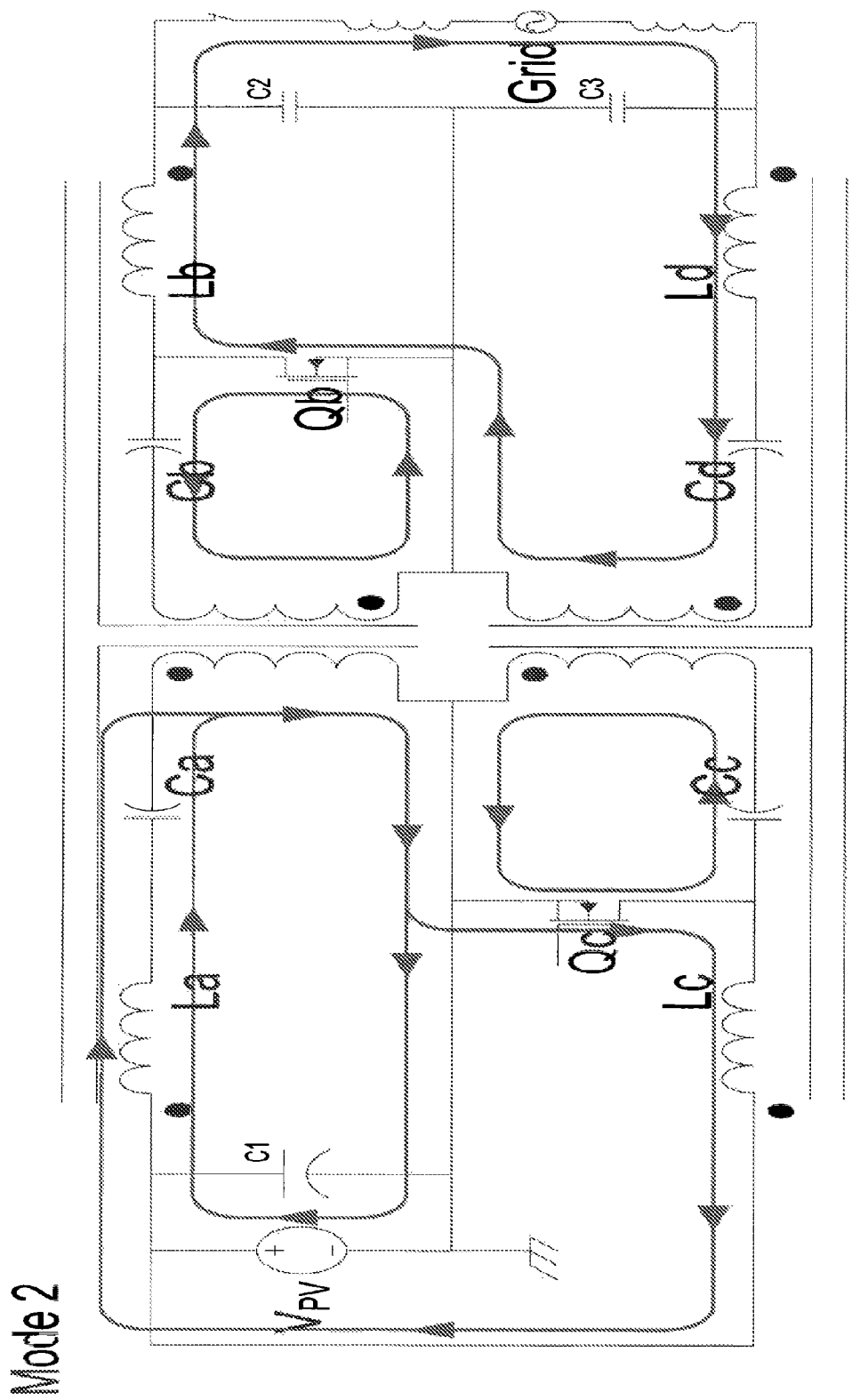
Figure 2D:
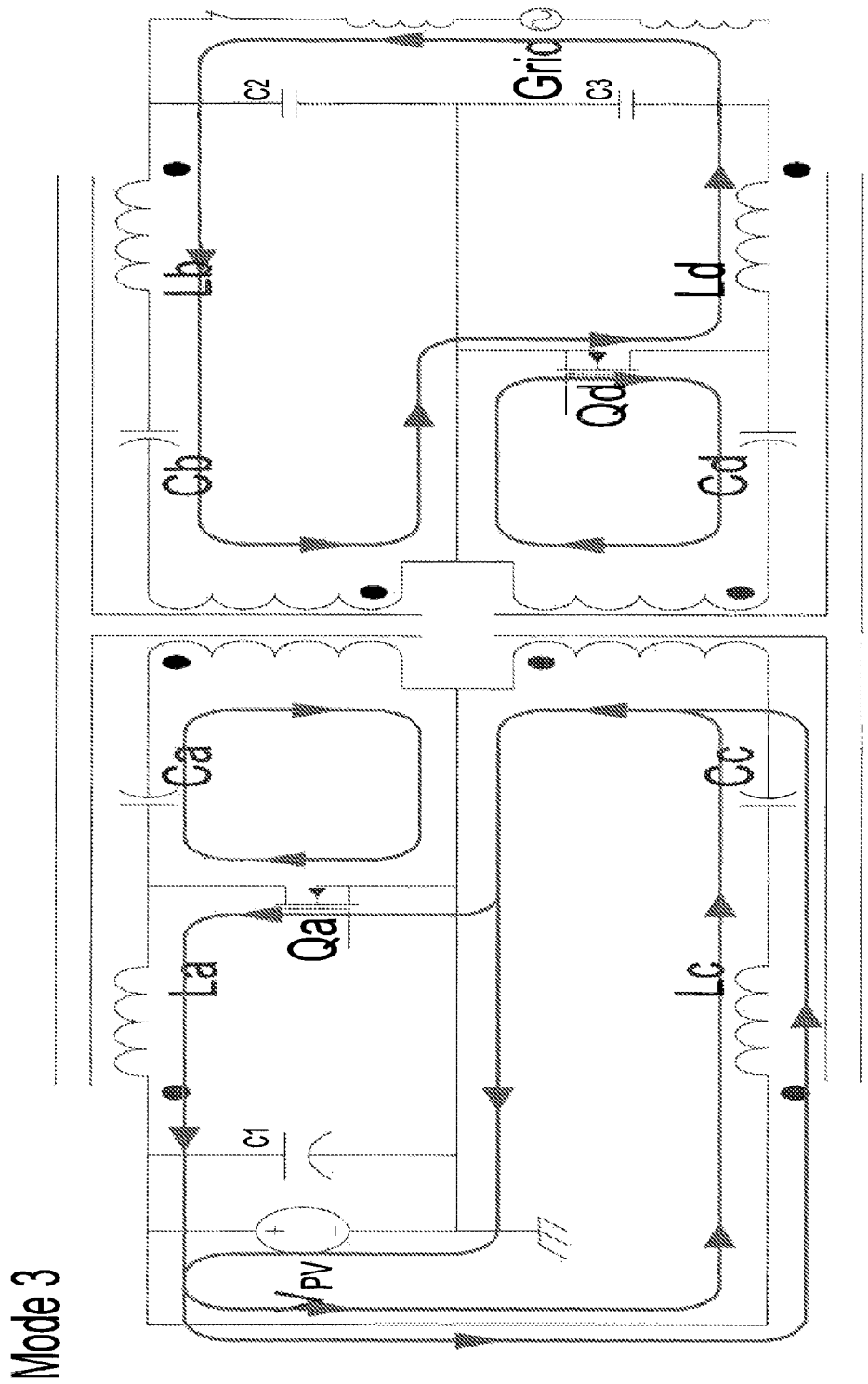
Figure 2E:
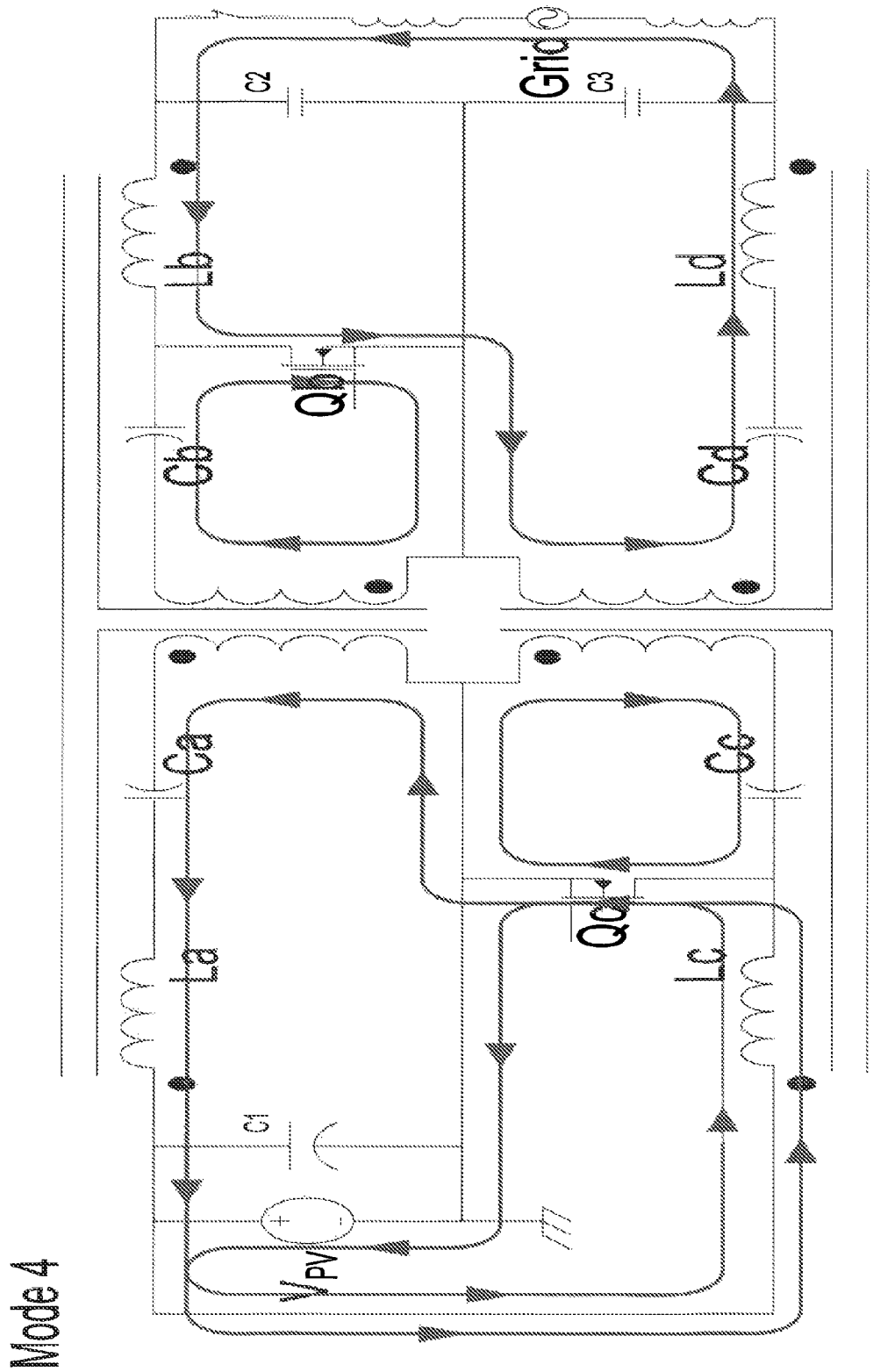

In FIG. 2C (Mode 2), switches $Q_a$ and $Q_d$ are turned off and $Q_b$ and $Q_c$ are turned ON. Capacitors $C_a$ and $C_d$ and $C_b$ and Cc are charged using the energy, which was stored in the inductors $L_a$ and $L_d$ while $Q_a$ and $Q_d$ were on. During this time, $L_b$ and $L_c$ release their energy. As mentioned above, FIGS. 2B and 2C complete the positive half of the line cycle. FIGS. 2D and 2E illustrate the comparable current flow paths for the negative half cycle.

A small amount of leakage inductance will be present on the primary side of the isolation transformers 20, 22 because of component practicality. The current flowing through this inductance changes sign quickly. This can cause voltage spikes, the magnitude of which depends on the size of the leakage inductance, input voltage, and output power. These spikes add to the voltage stress of sensitive devices such as the power MOSFETs.

Figure 3A:
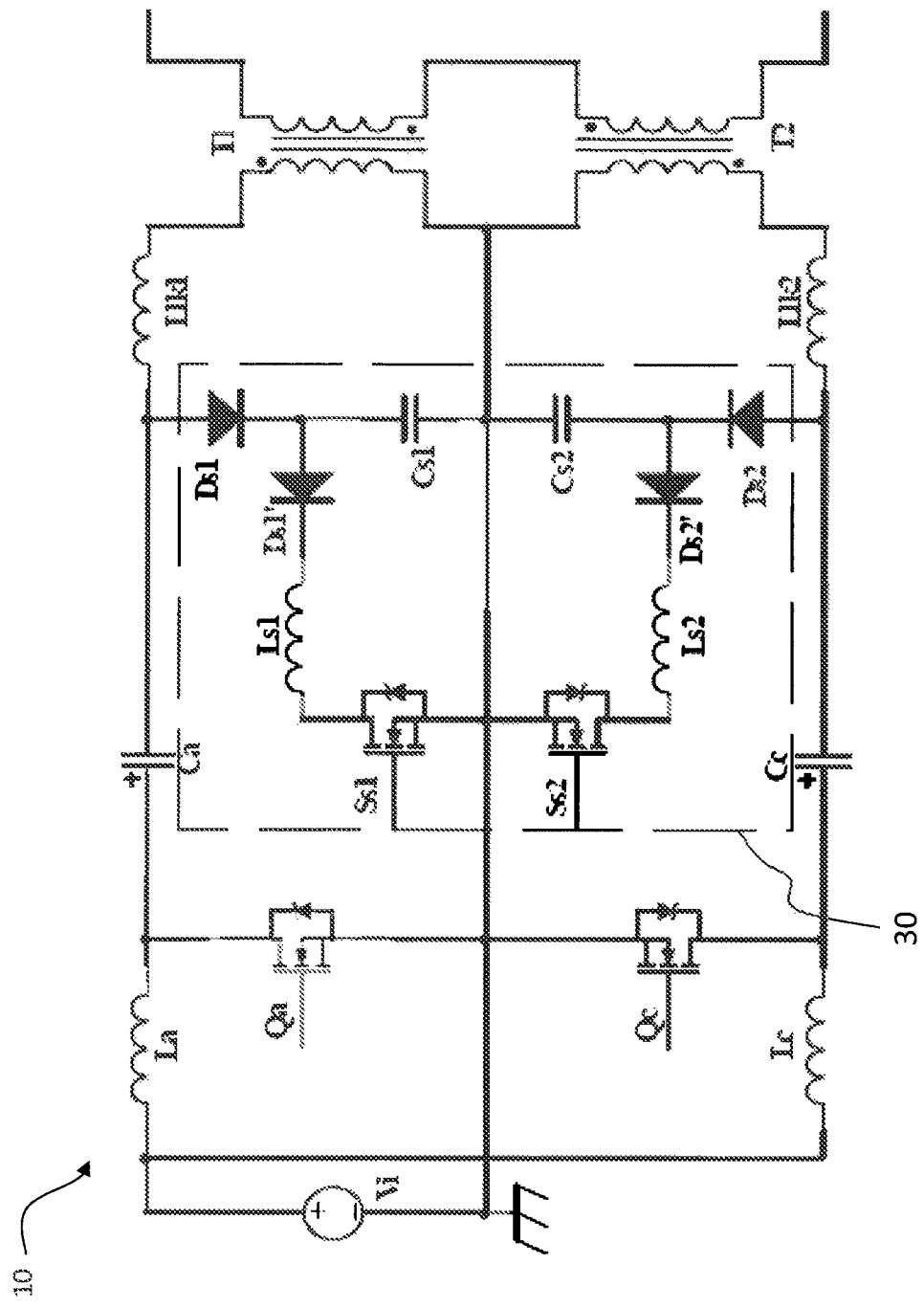
FIG. 3A illustrates a portion of a modified embodiment generally in accordance with FIG. 2A for device-loss and device-spike mitigations. Although not shown explicitly, the same modified embodiment is applicable to secondary-side devices of the converter topology.

A snubbing network can be applied across the primary (as well as secondary) side of the transformers 20 and 22 to serve this function. See, S. K. Mazumder, R. K. Burra, R. Huang, and V. Arguelles, "A Low-Cost Single-Stage Isolated Differential Ćuk Inverter for Fuel Cell Application", IEEE Power Electronics Specialists Conference, pp. 4426-4431 (2008). FIG. 3A shows a portion of the FIG. 2A converter 10 with a snubbing network 30 applied to the primary side of the transformers 20, 22. This reduces the voltage spike of the device significantly and the stored energy is recovered as well. By choosing a device with lower voltage rating, the device characteristics are improved, which is useful when achieving high efficiencies. Furthermore, by recovering the energy stored in the inductance, the efficiency of the inverter can be improved slightly.

The FIG. 2A circuitry includes multiple magnetics components, including four inductors $L_a$-$L_d$ and two transformers 20 and 22. While the individual inductor steady-state dynamics have a DC component, the transformer steady-state dynamics incorporate a DC component apart from an AC component. Existence of a DC component has an impact of enhancement of magnetics sizing and enhanced probability of core saturation. For single-phase inverter operation, the AC component comprises two scales: the switching frequency component and the output low-frequency component. The latter has an even more significant impact on the magnetics sizing.

Figure 3B:
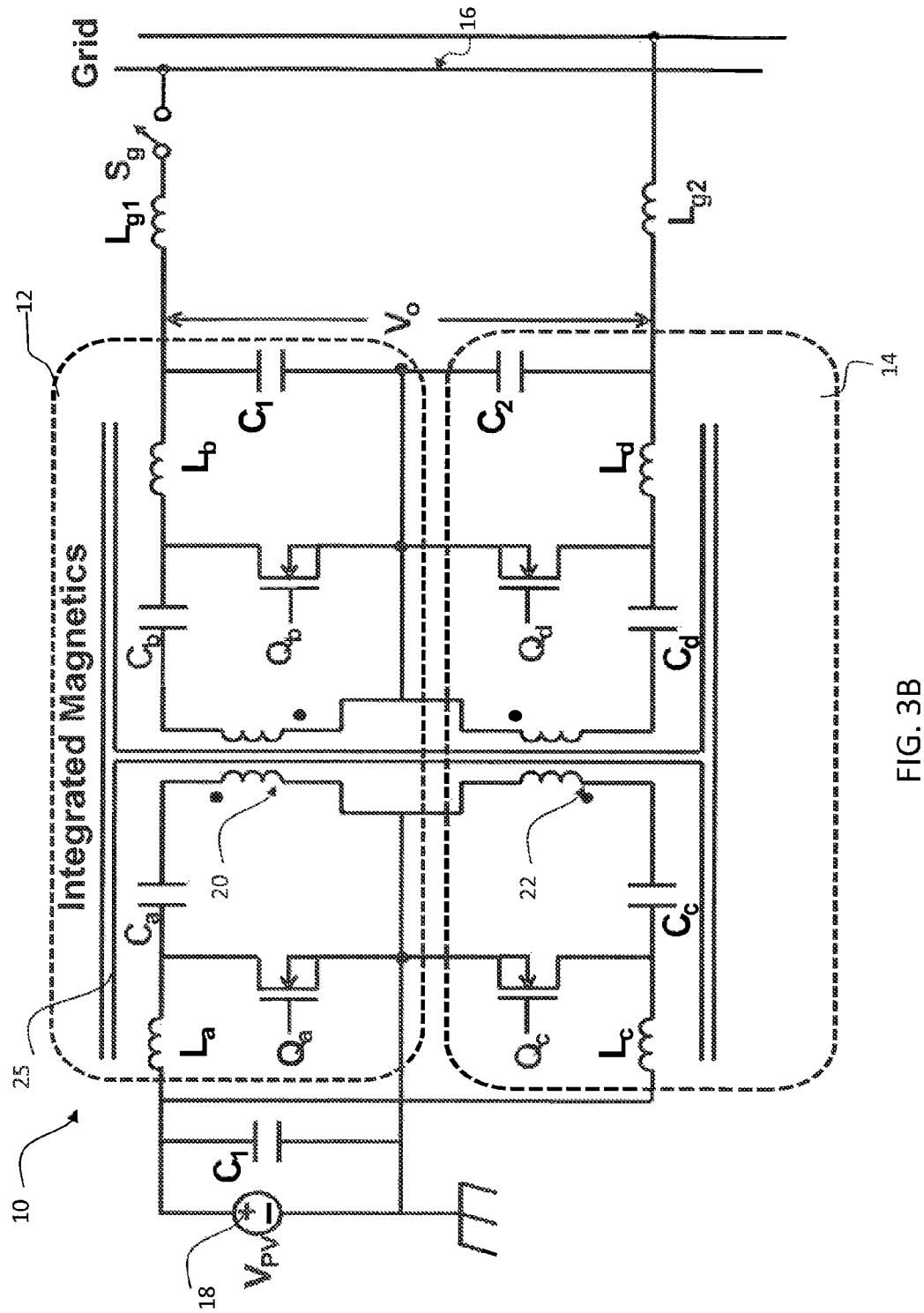
FIG. 3B illustrates another modified preferred embodiment in accordance with FIG. 2A showing the mechanism for integrating all of the magnetics of the entire differential-mode converter.

While the conventional integrated-magnetics approach applied in FIG. 2A has been used before as outlined in S. Cuk and R. D. Middlebrook, Advances in switched-mode power conversion, Tesla Co., (1983) for individual modules will reduce the number of cores and footprint somewhat, the impact the magnetic core will still be subjected to DC as well as low-frequency AC components. FIG. 3B, on the other hand, integrates all of the magnetics (including the inductors and the transformers) of both the modules 12, 14 on the same core 25. This approach is fundamentally different than prior integrated magnetics approaches, which eliminate the AC switching frequency component but not the DC component.

In FIG. 3B, the integrated magnetics is a common, unitary magnetic core 25 shared by the magnetic components of both modules 12, 14. This new integration is done in such a way so that the core 25 is subjected to differential of input and output inductor currents, which results in elimination of the DC component. The same strategy is applied for the transformers 20 and 22. It is noted that, if for some topologies if the transformers are subjected to only AC components, then the overall integrated magnetics needs to be integrated in a differential mode to only eliminate the DC component of inductor steady state dynamics. It is also noted that, for multiphase operation the mechanism of integration can be extended to include magnetics of all the phases or integrate on a per phase basis. Finally, since for DC/AC or AC/DC or AC/AC operations the ac ripple can be non-negligible, especially for single-/split-phase operations. The integrated magnetics can also be integrated with an additional (tertiary) winding fed by a ripple-correction circuitry for ripple mitigation.

If the voltage gain of the overall differential-mode inverter for single-phase sinusoidal-output topological embodiments such as the FIGS. 1A and 1B embodiments is nonlinear, then simple sinusoidal modulation of the switches alone does not always yield a desired sinusoidal output. For isolated inverters, the transformer turns ratio also affects the harmonic distortion of the output. A typical control scheme for the converter has an outer voltage loop which generates the current reference for the inner current loop. See, e.g., S. K. Mazumder, R. K. Burra, R. Huang, and V. Arguelles, "A Low-Cost Single-Stage Isolated Differential Cuk Inverter for Fuel Cell Application", IEEE Power Electronics Specialists Conference, pp. 4426-4431 (2008). The output of the current loop generates the command for the modulator that generates the switching signal. However, for nonlinear voltage gain, such an approach will often yield low-frequency harmonics at the output.

FIG. 4 demonstrates a new control scheme to compensate for this harmonic distortion without requiring large transformer turns ratio. In FIG. 4, the controller carries out a primary concept of setting different fundamental and harmonic-voltage-loop references for the outer loop controller instead of setting only one reference for the fundamental harmonic frequency. Thus, for example, to obtain a sinusoidal output, there is a fundamental-harmonic frequency reference compensator for current 52 and voltage 54. Other reference values for non-fundamental frequency current compensators $56_N$ and non-fundamental frequency voltage compensators $58_N$ are set to zero. The comparison of the voltage references with a voltage feedback 60 and then passing the error signals via the voltage-loop compensator sets up the current references for the inner current loops. Following the same principle, the inner current loop generates harmonic command signals using current feedback 62 and outputs from the voltage compensators, which are summed up to generate the overall duty cycle command for the converter switches as applied by a modulator 64. If the desired output (e.g. of an inverter) is non-sinusoidal, then, not all harmonic components even excluding the fundamental will have zero magnitude. However, the control architecture remains similar. Regarding voltage-control-loop compensation, the compensators 54 and $58_N$ can be proportional resonant controllers, one for each harmonic component with controller frequency tuning corresponding to the harmonic frequency. Such a controller enhances the gain at the tuned frequency. The compensation for the current loop is designed to enable higher bandwidth and disturbance rejection capability. The compensation can be based on proportional-resonant controller or other compensator. It is noted that it is not necessary that the control architecture be limited to the dual loop structure as demonstrated in the embodiment and can be generated based on other control criterion/criteria.

While such an approach works well for linear compensation of single-phase converters and extendable to split-phase and multi-phase (with number of phases higher than one) in the same manner (i.e. in stationary frame), for multiphase (with more than one phase) systems, the control mechanism can be implemented in a non-stationary frame (using appropriate basis transformation) (See, e.g. S. K. Mazumder, "A novel discrete control strategy for independent stabilization of parallel three-phase boost converters by combining space-vector modulation with variable-structure control," IEEE Transactions on Power Electronics, vol. 18, no. 4, pp. 1070-1083 (2003); S. K. Mazumder and K. Acharya, "Sequence-based control for standalone and networked switching power converters," IEEE Energy Conversion Conference and Exposition, pp. 1104-1111 (2009)). For example, by closing the control loops in a non-stationary synchronous frame, the dynamic response and control accuracy of the system may yield superior performance.

Figure 5:
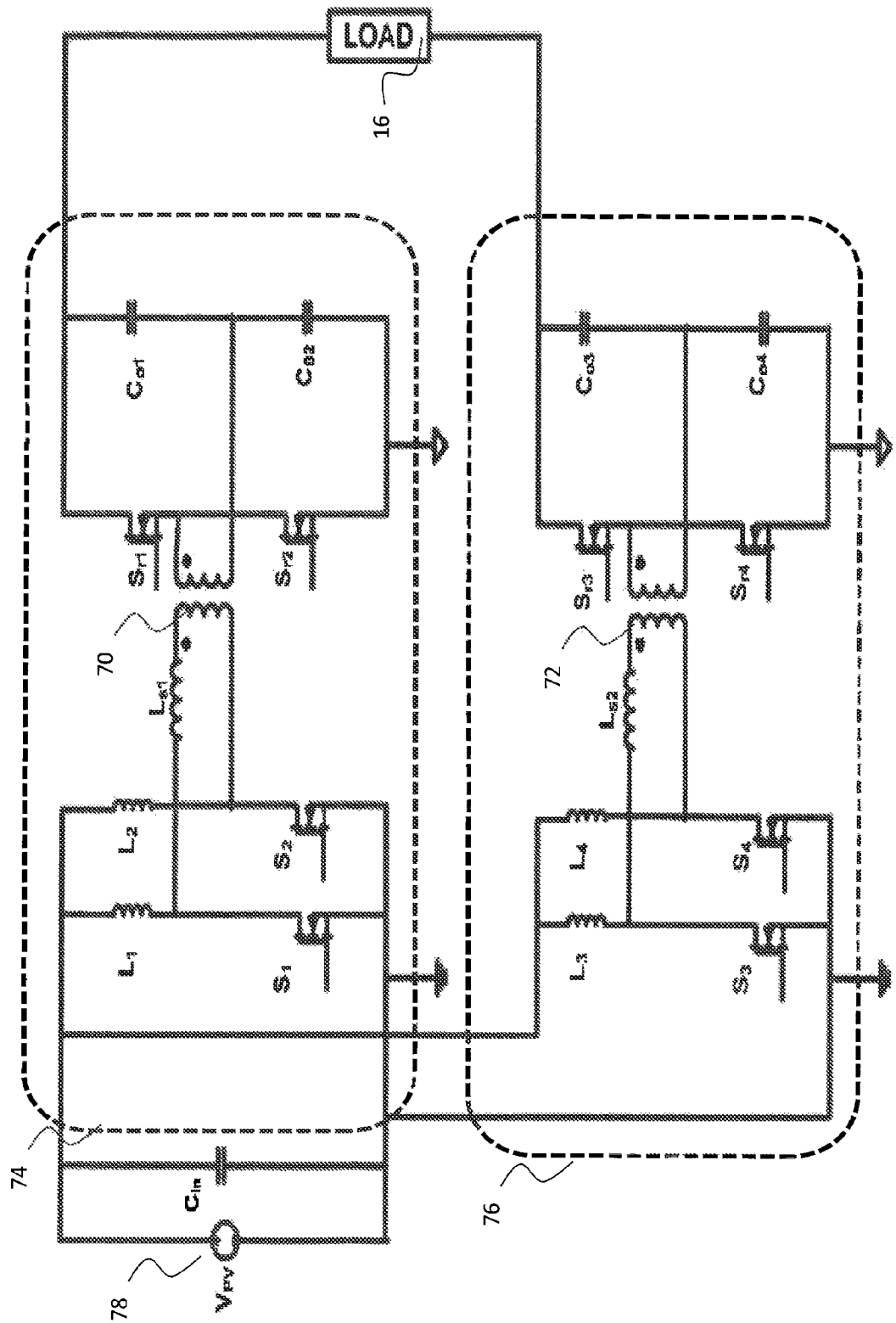
FIG. 5 illustrates a current-source converter embodiment of the invention.

FIG. 5 shows a current-source embodiment converter of the invention. In FIG. 5, primaries of transformers 70 and 72 two individual DC-DC converter modules 74 and 76, sourced by a PV (photovoltaic) current source 78, are connected in a differential mode and the output of the current-source inverter is the difference of the outputs of the two individual DC-DC converter modules. Each module has two primary-side switches, namely $S_1$ and $S_2$ and $S_3$ and $S_4$ and corresponding secondary-side switches $S_{r1}$ and $S_{r2}$ and $S_{r3}$ and $S_{r4}$. Switch pairs $S_1$ and $S_3$ and $S_2$ and $S_4$ are modulated in the same way but with a phase difference of 180 degree. Switch pairs $S_1$-$S_{r1}$, $S_2$-$S_{r2}$, $S_3$-$S_{r3}$, and $S_4$-$S_{r4}$ are triggered by complementary gate pulses. The control strategy of the inverter is consistent with that in FIG. 4. Soft-switching logic can be added to the modulator to control the switches in accordance with Table 1 below.

The voltage gain of the inverter (under hard-switching) is obtained next. Basically, the output voltages of the first and the second module is given by the following:

$$V_{o1} = \frac{2 \cdot n \cdot V_{PV}}{(1 - d_1)},$$

$$V_{o2} = \frac{2 \cdot n \cdot V_{PV}}{(1 - d_2)}$$

where $d_1$ and $d_2$ are the duty cycles of the primary-side switches of the first and the second module, respectively. Symbol n represents the turns ratio of both the transformers. The output voltage of the inverter is the difference in the output voltages of the two modules and is given by $$V_o = V_{o1} - V_{o2}$$
$$= \frac{2 \cdot n \cdot V_{PV}}{(1 - d_1)} - \frac{2 \cdot n \cdot V_{PV}}{(1 - d_2)}$$
$$= 2 \cdot n \cdot V_{PV}\left(\frac{d_1 - d2}{(1 - d_1)(1 - d_2)}\right).$$

Let $d_1$=D+D' sin ($\omega$t), $d_2$=D−D' sin($\omega$t); then, voltage gain of the inverter is given by $$\frac{V_o}{V_{PV}} = 4 \cdot n \cdot \sin(\omega t)\left(\frac{D'}{(1 - D)^2 - D'^2\sin^2(\omega t)}\right).$$

The voltage gain depends on the transformer turns ratio and the duty cycle. Thus, an optimum balance between turns ratio and D (and D') is important. The duty cycles have a range of 50-100%. The inverter should not be operated below 50% to avoid a condition of inconsistency in the input inductor currents.

The topological modes of the inverter, for a specific sinusoidal modulation scheme under hard switching, are presented in FIGS. 6A-6F. When $S_1$ and $S_2$ or $S_3$ and $S_4$ of each module are turned on together, then that initiates the boost mode. During this mode, the output capacitors of one module feed energy to the capacitors of the other module via the load. For all other switching configurations, there is an exchange of power between the primary and the secondary as well as from one module to the other.

In addition, in these modes, there is a localized charging of output capacitor of one module. The direction of power flow depends on the time-domain voltage and current profiles. For instance, for a unity-power-factor passive load, for positive line cycle of the output voltage (across the load), power flows from the PV source via the primary module while during the negative half cycle, power flows via the bottom module.

Figure 6A:
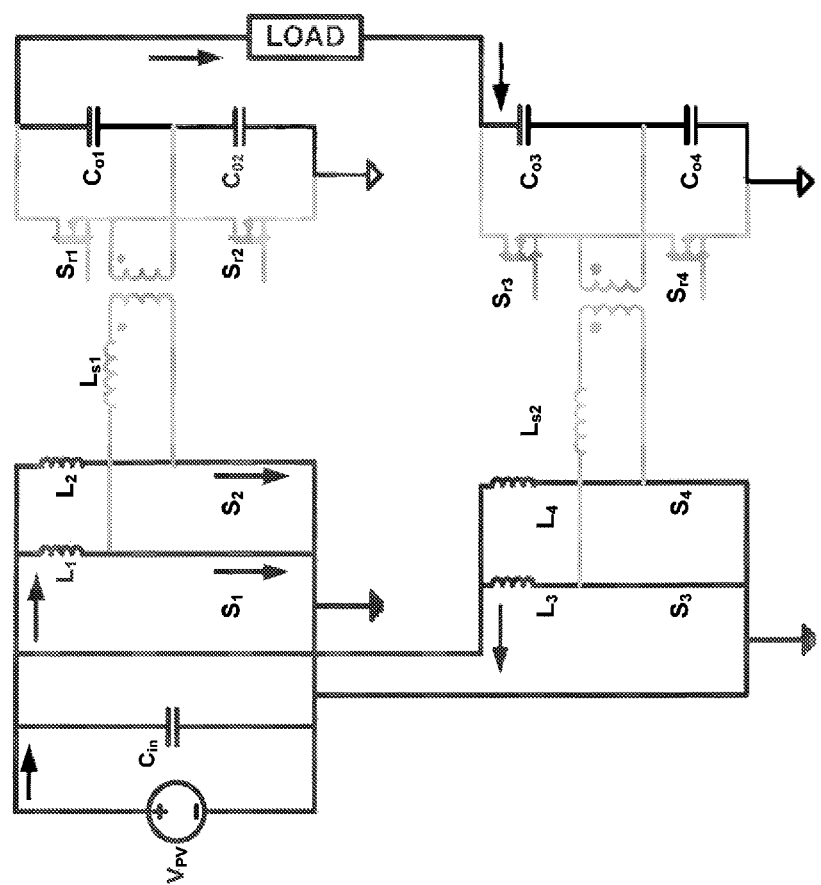
FIGS. 6A-6F illustrate operational modes for the FIG. 5 converter.

The operation of the inverter in the positive half cycle of the output is analyzed by the following modes. In FIG. 6A (Mode 1), during this interval the $S_1$, $S_2$, $S_3$ and $S_4$ are turned on. Hence, current in both the transformers is zero. Power to the load is supplied by the output capacitors of the upper module $C_{o1}$ and $C_{o2}$. The output capacitors of the lower module, $C_{o3}$ and $C_{o4}$ are charged in this mode. The lower DC/DC converter acts as the receiving module. The input current in the upper and the lower module from the PV source is given by $i_{in1}$ and $i_{in2}$, respectively. The currents through the primary side switches are given by $$i_{s1} = i_{s2} = \frac{i_{in1}}{2}$$

$$i_{s3} = i_{s4} = \frac{i_{in2}}{2}$$

Figure 6B:
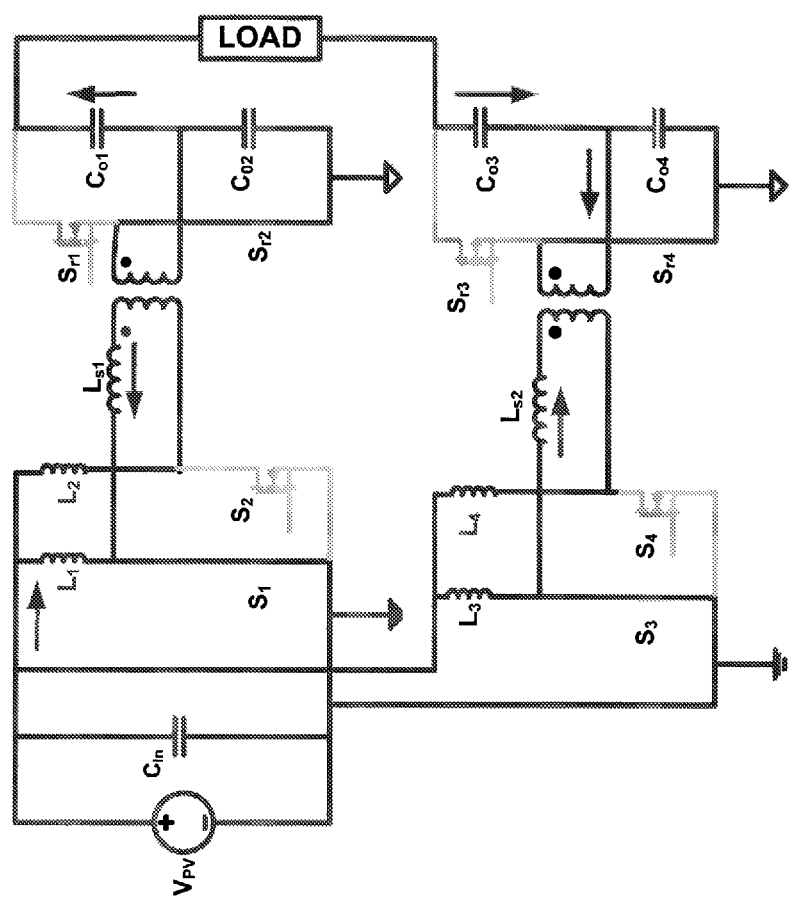

In FIG. 6B (Mode 2), $S_1$ and $S_3$ and $S_{r2}$ and $S_{r4}$ are turned on. The negative current raises through the leakage $L_{s1}$ and the current through switch $S_1$ raises with the same slope as the current through $L_{s1}$. Capacitor $C_{o2}$ is charged and capacitor $C_{o1}$ discharges through the load, $C_{o3}$ and the secondary of the transformer of the lower module. Capacitor $C_{o4}$ is also charged in this mode. The current through the leakage inductance $L_{s2}$ is positive and begins to increase with the same slope as the current through the leakage inductance $L_{S1}$. The currents through the primary-side switches and the leakage inductors are given by $$i_{Ls1} = -\frac{V_{o1}}{2nL_{s1}}(\Delta t)$$

$$i_{Ls2} = \frac{V_{o2}}{2nL_{s2}}(\Delta t)$$

$$i_{s1} = \frac{i_{in1}}{2} + i_{Ls1}$$

$$i_{s3} = \frac{i_{in2}}{2} + i_{Ls2}$$

where $\Delta t$ is the time interval for Mode 2.

Figure 6C:
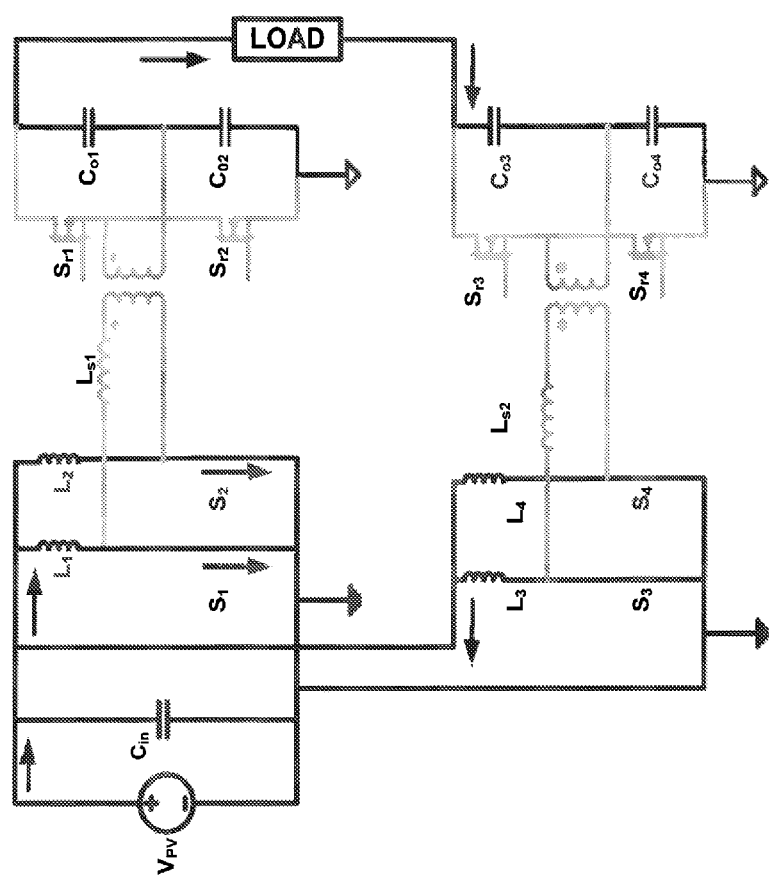

In FIG. 6C (Mode 3), operation is similar to the Mode 1 where all the primary-side switches in both the modules are turned on and all the secondary-side switches of both the modules are turned off. The current through the transformer is zero. The output capacitors of the upper module 74 feed the load current and the lower converter 76.

Figure 6D:
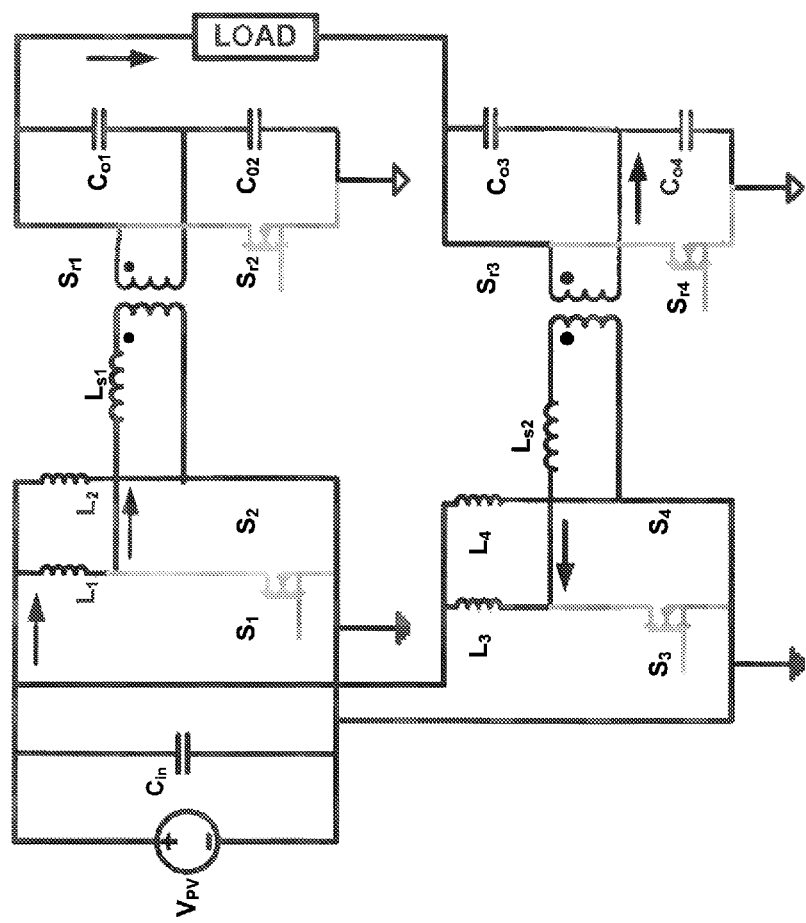

In FIG. 6D (Mode 4), $S_2$ and $S_4$ and $S_{r1}$ and $S_{r3}$ are turned on. The current through $S_1$ in Mode 3 is diverted to $L_{S1}$ due to voltage across the primary of the upper transformer, which in turn, is due to the voltage across $C_{o2}$. Capacitors $C_{o1}$ and $C_{o3}$ are charged by the source. Capacitor $C_{o2}$ discharges through the load, the transformer secondary, and $C_{o4}$. Current through $S_2$ and the negative current through $L_{S2}$ rise with the same slope as the current through $L_{S1}$. The currents through the primary-side switches and the leakage inductors are given by $$i_{Ls1} = \frac{V_{o1}}{2nL_{s1}}(\Delta t)$$

$$i_{Ls2} = -\frac{V_{o2}}{2nL_{s2}}(\Delta t)$$

$$i_{s2} = \frac{i_{in1}}{2} + i_{Ls1}$$

$$i_{s4} = \frac{i_{in2}}{2} + i_{Ls2}$$

Figure 6E:
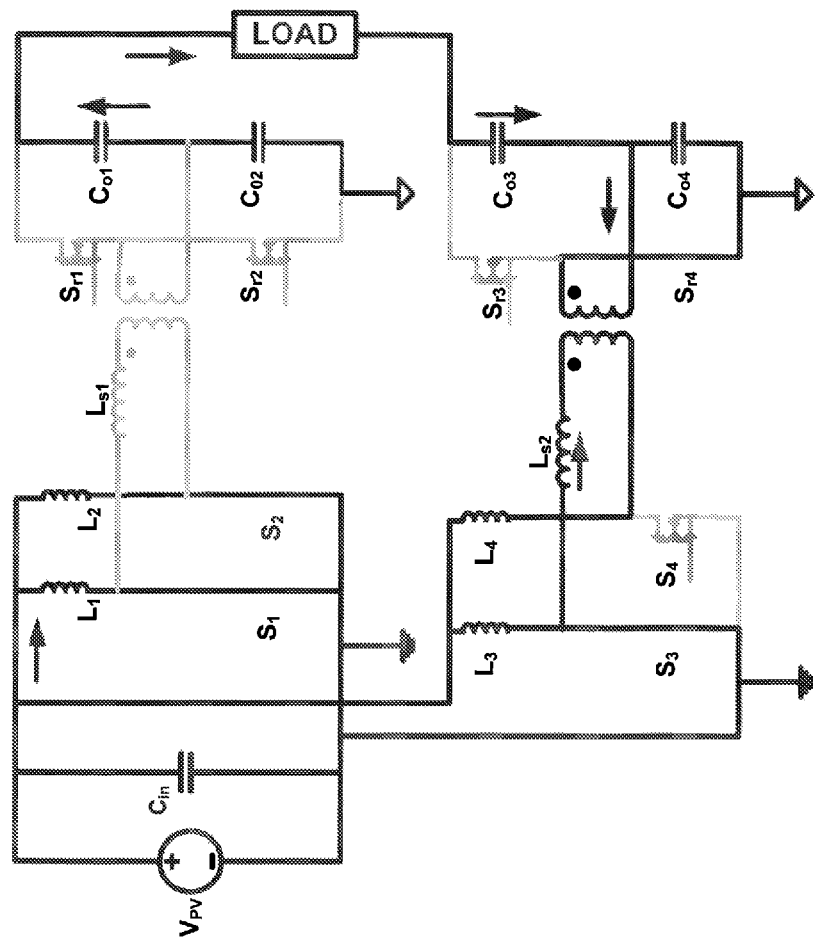

In FIG. 6E (Mode 5), $S_1$, $S_2$, $S_3$, and $S_{r4}$ are turned on. The current through the upper transformer is zero. Capacitors $C_{o1}$ and $C_{o2}$ discharge through the load, $C_{o3}$, and the secondary of the transformer of the lower module. Capacitor $C_{o4}$ of the lower module is also charged in this mode. The current through $L_{s2}$ is positive. The currents through $S_3$ and $L_{s2}$ are given by $$i_{s3} = \frac{i_{in2}}{2} + i_{Ls2}$$

$$i_{Ls2} = \frac{V_{o2}}{2nL_{s2}}(\Delta t)$$

Figure 6F:
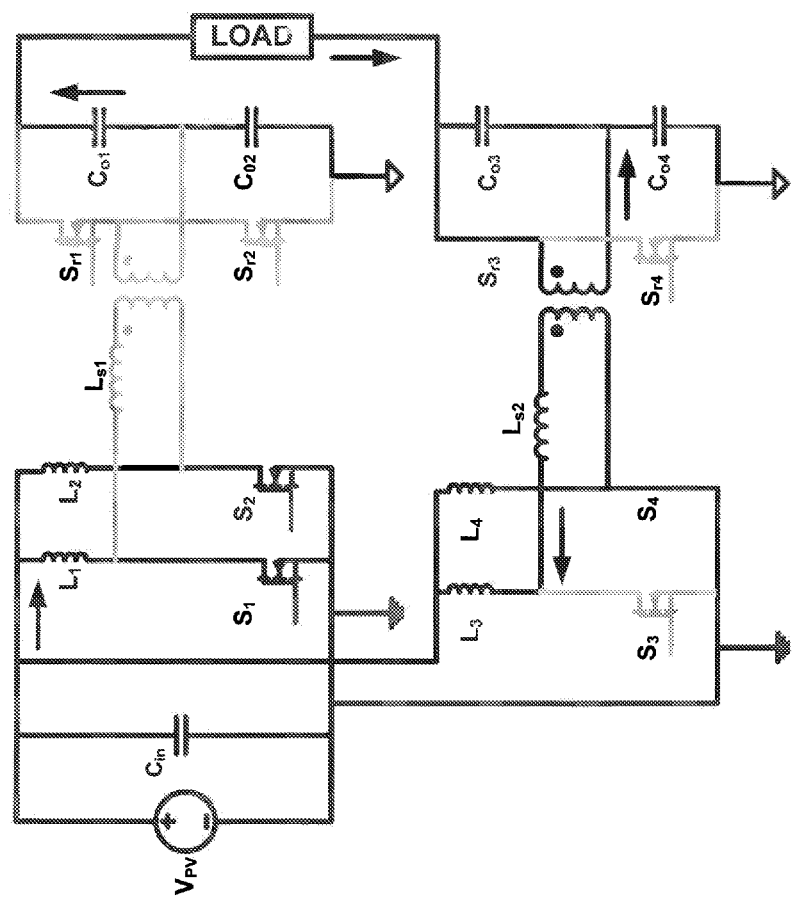

In FIG. 6F (Mode 6), $S_1$, $S_2$, $S_4$, and $S_{r3}$ are turned on. The current in the upper transformer is zero. Capacitors $C_{o1}$ and $C_{o2}$ discharge through the load, secondary of the lower-module transformer, and $C_{o4}$. Capacitor $C_{o3}$ is also charged in this mode. The currents through $L_{s2}$ are negative and given by $$i_{Ls2} = -\frac{V_{o2}}{2nL_{s2}}(\Delta t)$$

$$i_{s4} = \frac{i_{in2}}{2} + i_{Ls2}$$

Modes 5 and 6 determine the maximum point and the zero crossing of the output. The zero crossing occurs when difference in the output of the two modules is zero; while the maximum point occurs when the difference of the individual outputs is maximum.

The feasible switching states of the inverter are provided in Table 1 below. The first set of three switching states (i.e. a-c) form major part of a switching cycle. The last set of four switching states (i.e. d-g) exists for a shorter duration and may exist either in the positive half cycle or in the negative half cycle. Switching states d-g occur in the vicinity of the maximum, the minimum, or the zero-crossing point of the output voltage.

TABLE 1

Possible switching states of the inverter.

| Switching states of the inverter | $S_1$ | $S_2$ | $S_3$ | $S_4$ |
|---|---|---|---|---|
| a. | 1 | 1 | 1 | 1 |
| b. | 1 | 0 | 1 | 0 |
| c. | 0 | 1 | 0 | 1 |
| d. | 1 | 1 | 1 | 0 |
| e. | 1 | 1 | 0 | 1 |
| f. | 0 | 1 | 1 | 1 |
| g. | 1 | 0 | 1 | 1 |

Figure 7A:
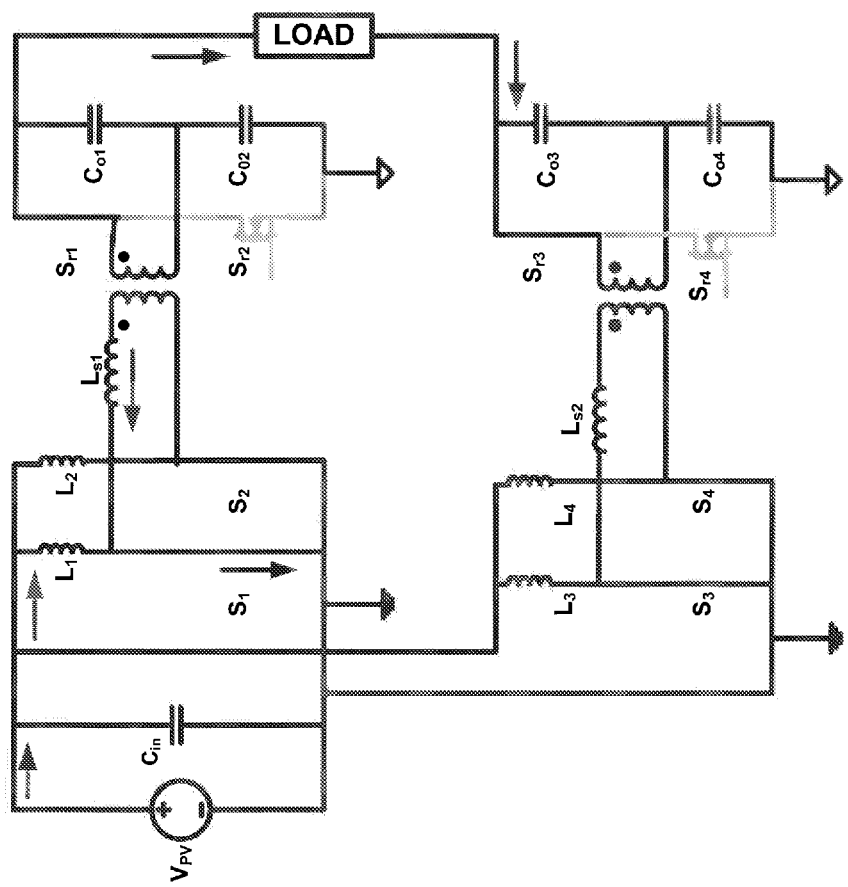
FIGS. 7A-7D illustrate zero-current switching modes for the FIG. 5 converter.

The inverter of FIG. 5 can also be operated in zero-current switching mode (ZCS). These modes are explained with respect to FIGS. 7A-7D. In FIG. 7A (Modes 1→2) control turns off $S_3$ and $S_4$ before Mode 2. $S_{r1}$ and $S_{r3}$ are turned on to aid ZCS of $S_2$ and $S_4$ in Mode 2. When $S_{r1}$ is turned on, voltage across $C_{o1}$ is applied across the secondary of the transformer. This causes a voltage at the primary and hence the current through $S_2$ is diverted to $L_{s1}$. The capacitor $C_{o2}$ discharges through the load, $C_{o3}$, and the secondary of the transformer.

Figure 7B:
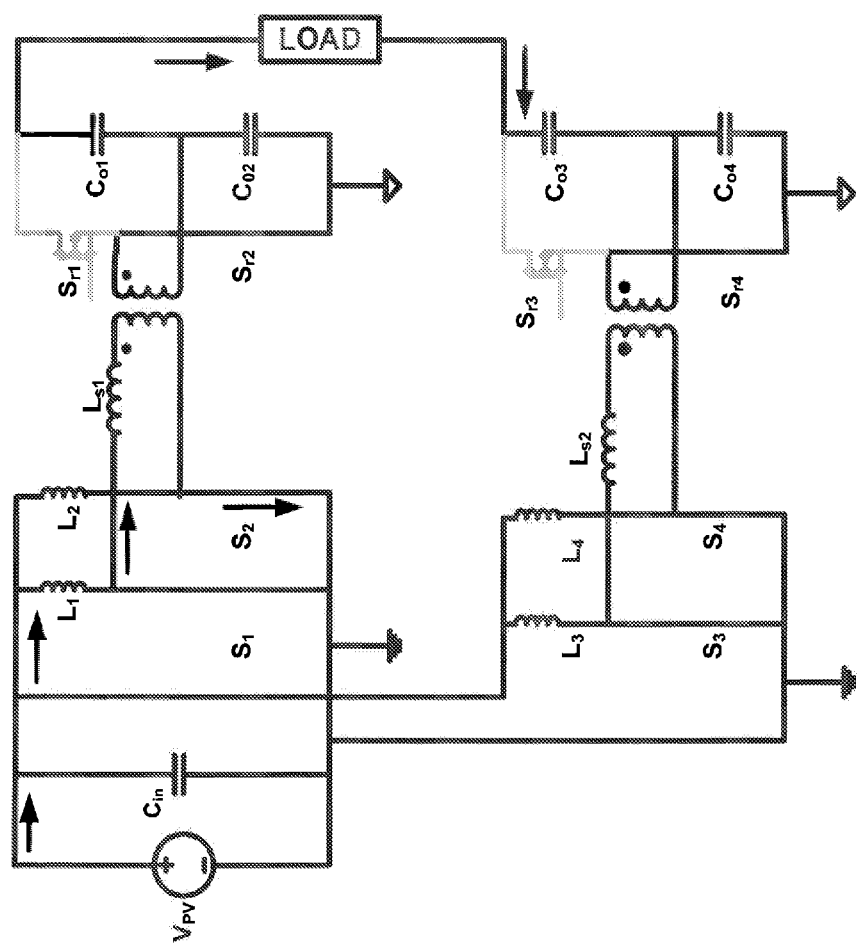

In FIG. 7B (Modes 3→4) control turns off $S_1$ and $S_3$ before Mode 4. $S_{r2}$ and $S_{r4}$ are turned on to aid ZCS of $S_1$ and $S_3$. When $S_{r2}$ is turned on, the voltage across $C_{o2}$ is applied across the secondary of the transformer. This causes a voltage at the primary and hence the current through $S_1$ is diverted to $L_{S1}$. In this mode the capacitor $C_{o1}$ discharges through the load, capacitor $C_{o3}$ and the secondary of the transformer.

Figure 7C:
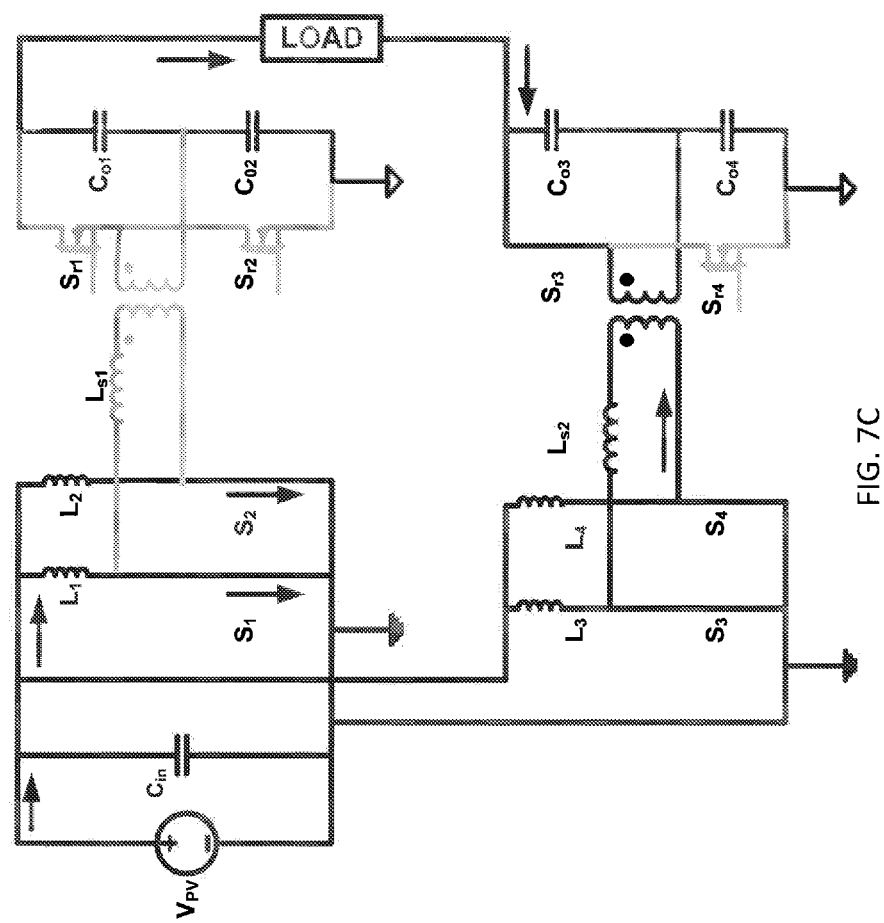
Figure 7D:
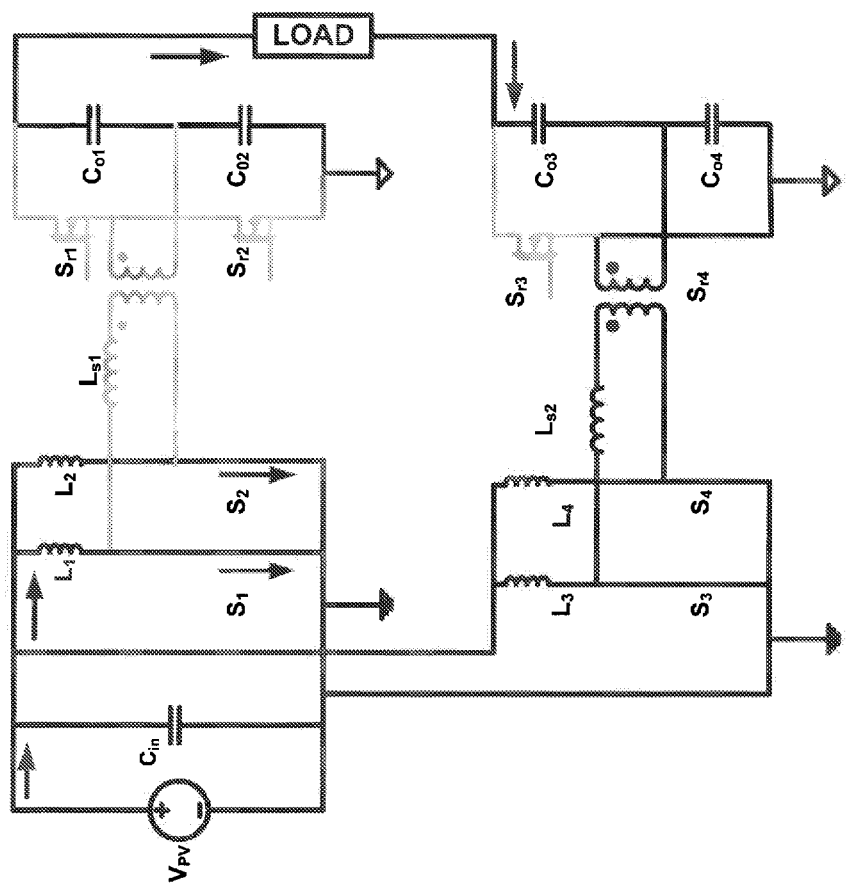

In FIG. 7C (Modes 4→5) control turns off $S_4$ by turning on $S_{r3}$ before Mode 5. When $S_{r3}$ is turned on, the voltage across $C_{o3}$ is applied across the secondary of the lower transformer. This causes voltage across the primary and hence the current through $S_4$ is diverted to $L_{S2}$.

In FIG. 7C (Modes 5→6) control off $S_3$ by turning on $S_{r4}$ before Mode 6. When $S_{r4}$ is turned on, the voltage across $C_{o4}$ is applied across the secondary of the lower transformer. This causes voltage across the primary and hence the current through $S_3$ is diverted to $L_{S2}$. The additional duty cycle ($d_r$) of the secondary-side switches is ensured for the entire range by modulating the primary-side switches of both the modules using trailing-edge modulation.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A single-stage DC/AC power converter, comprising:
   at least two bi-directional converter modules connected in differential configuration, each of said two bi-directional converter modules having primary and secondary sides separated by transformers and including inductors for current flow and energy storage, wherein each of the two bi-directional converter modules comprises transformers and inductors that are integrated on one or more cores;
   switches controlling current flow in the primary and secondary sides to create positive and negative half cycle AC current to an output on said secondary side from a DC power source on said primary side or controlling current flow in the primary and secondary sides to create AC output on said primary/secondary side from an AC power source on said secondary/primary side;
   a loop controller having an outer voltage loop and an inner current loop with a first modulator that controls modulation of said switches via a second modulator referenced by said inner current loop, wherein one or both of said outer voltage loop and said inner current loop include a fundamental frequency compensator and a plurality of harmonic frequency compensators, and further including different fundamental and harmonic voltage loop references for outer loop control.

2. The power converter of claim 1, wherein said converter modules comprise isolated Ćuk converters.

3. The power converter of claim 1, wherein said converter modules comprise a voltage-source topology.

4. The power converted of claim 1, wherein said converter modules comprise a current-source topology.

5. The power converter of claim 1, wherein said converter comprise two converter modules and said switches are controlled by said controller to output single-phase AC power.

6. The power converter of claim 1, wherein said harmonic-voltage-loop control references are set to zero for sinusoidal output or set to desired reference values for non-sinusoidal output.

7. The power converter of claim 1, wherein the fundamental and harmonic voltage loop references are compared with voltage feedback from said converter modules and resultant error signal provide current references to compensators of said inner current loop.

8. The power converter of claim 1, wherein the control loop compensation can be linear and/or nonlinear and wherein control loop execution can be in time-varying and/or time-invariant reference frame(s).

9. The power converter of claim 1, wherein said converter with each module having a transformer center tap and said switches being controlled by said controller to output split-phase AC power.

10. The power converter of claim 1, wherein said converter comprise three converter modules and said switches are controlled by said controller to output three phase AC power.

11. The power converter of claim 1, wherein said converter comprise N (with N>2) converter modules and said switches are controlled by said controller to output N-phase AC power.

12. The power converter of claim 1, wherein the transformers and inductors of both of the converter modules are integrated on one or more core.

13. The power converter of claim 1, further comprising a loss-mitigating snubbing network applied across the primary- and/or secondary-side switches to reduce device voltage stress and voltage spike and recover energy stored in transformer leakage inductance.

14. The power converter of claim 1,
   wherein said outer voltage loop includes a DC compensator or includes a DC compensator and a plurality of harmonic frequency compensators and said inner current loop includes a fundamental frequency compensator and a plurality of harmonic frequency compensators.

15. A method of converting power, the method comprising:
   inputting power to a plurality of separate converter modules from a power source;
   generating an output across each of the plurality of separate converter modules, wherein one of the input and the output has a DC component and an AC component; and
   controlling switching of the plurality of separate converter modules to be out of phase such that a difference of the outputs eliminates DC harmonics and retains a desired AC signal, wherein said controlling comprises compensating desired fundamental frequency with a fundamental frequency voltage reference and compensating harmonic frequency with a harmonic frequency reference set to zero by comparing to a voltage feedback from the converter modules, and then setting current references for a current compensators with the outputs from the voltage comparisons, and driving a modulator for switches in said converter modules from the current compensators.

16. The method of claim 14,
   wherein the output and the input have a DC component and an AC component; and
   wherein said controlling controls switching such that the input current is ensured to be sinusoidal or harmonic-specific.

* * * * *